United States Patent
Sung et al.

(10) Patent No.: US 10,555,156 B2
(45) Date of Patent: Feb. 4, 2020

(54) WIRELESS BLUETOOTH COMMUNICATION MECHANISM CAPABLE OF EFFECTIVELY REDUCING NUMBER OF AUDIO PACKET RETRANSMISSION

(71) Applicant: Audiowise Technology Inc., Hsinchu County (TW)

(72) Inventors: Chih-Wei Sung, Hsin-Chu (TW); Pete Hsinhsiang Liu, Sunnyvale, CA (US); Jing-Syuan Jia, Hsin-Chu (TW); Wei-Chung Peng, Hsin-Chu (TW); Kuang-Hu Huang, Hsin-Chu (TW); Jeng-Hong Chen, Sunnyvale, CA (US); I-Ken Ho, Hsin-Chu (TW); Wei-Chih Chen, Hsin-Chu (TW); De-Hao Tseng, Hsin-Chu (TW)

(73) Assignee: Audiowise Technology Inc., Hsinchu County (TW)

( * ) Notice: Subject to any disclaimer, the term of this patent is extended or adjusted under 35 U.S.C. 154(b) by 0 days.

(21) Appl. No.: 16/034,370

(22) Filed: Jul. 13, 2018

(65) Prior Publication Data

US 2019/0141502 A1   May 9, 2019

Related U.S. Application Data

(63) Continuation-in-part of application No. 15/808,853, filed on Nov. 9, 2017, now Pat. No. 10,212,569.

(51) Int. Cl.
*H04W 4/80*     (2018.01)
*H04W 72/04*    (2009.01)
*H04L 1/16*     (2006.01)
*H04R 1/10*     (2006.01)
*H04R 3/00*     (2006.01)

(52) U.S. Cl.
CPC ............... *H04W 4/80* (2018.02); *H04L 1/16* (2013.01); *H04R 1/1091* (2013.01); *H04W 72/0446* (2013.01); *H04R 3/00* (2013.01); *H04R 2420/07* (2013.01)

(58) Field of Classification Search
CPC .... H04W 4/80; H04W 72/0446; H04R 5/033; H04R 3/00; H04R 3/12; H04L 1/16
See application file for complete search history.

(56) References Cited

U.S. PATENT DOCUMENTS

| | | |
|---|---|---|
| 8,010,047 B2 | 8/2011 | Terashima |
| 8,768,252 B2 | 7/2014 | Watson |
| 9,020,437 B2 | 4/2015 | Watson |
| 9,621,987 B2 | 4/2017 | Watson |
| 9,712,186 B1 * | 7/2017 | Schulz ................. H04L 1/1829 |
| 9,788,117 B2 | 10/2017 | Watson |

(Continued)

*Primary Examiner* — Devan A Sandiford
(74) *Attorney, Agent, or Firm* — Winston Hsu

(57) ABSTRACT

A method applied into a controller of a wireless Bluetooth device includes: providing a first flag and a second flag; asserting the first flag when the controller successfully receives the particular packet transmitted from the audio gateway; asserting the second flag when the controller successfully receives an acknowledgement from a secondary device wherein a reception of the acknowledgement indicates that the secondary device successfully receives the particular packet; and transmitting an acknowledgement of a particular packet to an audio gateway when the first flag and the second flag are asserted.

11 Claims, 5 Drawing Sheets

(56) References Cited

U.S. PATENT DOCUMENTS

| | | | |
|---|---|---|---|
| 9,794,393 B2 | 10/2017 | Hsieh | |
| 9,838,829 B2* | 12/2017 | El-Hoiydi | H04R 25/556 |
| 10,178,711 B2 | 1/2019 | Li | |
| 10,206,039 B1* | 2/2019 | Yun | H04R 3/12 |
| 10,212,569 B1* | 2/2019 | Huang | H04L 1/22 |
| 10,244,307 B1 | 3/2019 | Tong | |
| 2001/0002906 A1 | 6/2001 | Rune | |
| 2005/0270565 A1* | 12/2005 | Shima | H04N 1/00915 358/1.15 |
| 2006/0194600 A1 | 8/2006 | Palin | |
| 2006/0205401 A1 | 9/2006 | Palin | |
| 2007/0036247 A1* | 2/2007 | Capretta | H04L 27/22 375/343 |
| 2008/0084824 A1 | 4/2008 | Chin | |
| 2009/0109916 A1 | 4/2009 | Berg | |
| 2009/0119422 A1 | 5/2009 | Kale | |
| 2009/0238375 A1 | 9/2009 | Pilati | |
| 2010/0188212 A1 | 7/2010 | Jochelson | |
| 2010/0232618 A1 | 9/2010 | Haartsen | |
| 2011/0059696 A1 | 3/2011 | Rasmussen | |
| 2011/0129048 A1 | 6/2011 | Barbe | |
| 2012/0058727 A1* | 3/2012 | Cook | H04R 5/02 455/41.3 |
| 2014/0137199 A1* | 5/2014 | Hefetz | G06Q 20/32 726/3 |
| 2015/0334488 A1 | 11/2015 | Kim | |
| 2015/0350814 A1* | 12/2015 | Krochmal | H04L 5/0035 455/41.2 |
| 2016/0316051 A1 | 10/2016 | Hsieh | |
| 2017/0134227 A1 | 5/2017 | Song | |
| 2017/0188152 A1 | 6/2017 | Watson | |
| 2017/0251469 A1 | 8/2017 | Lee | |
| 2018/0077493 A1 | 3/2018 | Watson | |
| 2018/0084456 A1* | 3/2018 | Gostev | H04R 1/1016 |
| 2018/0084569 A1 | 3/2018 | Li | |
| 2018/0084606 A1* | 3/2018 | Li | H04W 88/04 |
| 2018/0091965 A1 | 3/2018 | Watson | |
| 2018/0184234 A1* | 6/2018 | Chen | H04W 4/80 |
| 2018/0317126 A1 | 11/2018 | Wang | |
| 2018/0352558 A1 | 12/2018 | Paycher | |
| 2019/0037312 A1 | 1/2019 | Watson | |
| 2019/0104424 A1 | 4/2019 | Hariharan | |

* cited by examiner

WIRELESS BLUETOOTH COMMUNICATION MECHANISM CAPABLE OF EFFECTIVELY REDUCING NUMBER OF AUDIO PACKET RETRANSMISSION

BACKGROUND OF THE INVENTION

1. Field of the Invention

The invention relates to a Bluetooth audio communication mechanism, and more particularly to a controller of a wireless stereo Bluetooth device, corresponding method, and such Bluetooth device.

2. Description of the Prior Art

Generally speaking, for a conventional Bluetooth communication, there is a great probability that a primary/master device successfully receives and decodes a Bluetooth packet but a secondary/slave device fails in a first time slot while the secondary/slave device successfully receives and decodes the retransmitted Bluetooth packet but the primary/master device fails in a second time slot later than the first time slot. This causes the larger number of Bluetooth packet retransmission. The retransmission probability becomes higher especially when the primary device (or secondary device) is farther away from an audio gateway in a strong interfering environment and/or the wireless communication signal between the primary and secondary devices is partly blocked by an object such as a user's head when the primary and secondary devices are earphones or headsets.

SUMMARY OF THE INVENTION

Therefore one of the objectives of the invention is to provide a novel Bluetooth audio communication mechanism, to solve the above-mentioned problems.

According to embodiments of the invention, a controller of a wireless stereo Bluetooth device is disclosed. The controller is capable of used as a primary device and comprises a memory and a processor. The memory is configured for storing a first flag and a second flag. The processor is coupled to the memory, and is configured for transmitting an acknowledgement of a particular packet to an audio gateway when the first flag and the second flag are asserted. The first flag is asserted by the processor when the processor successfully receives and decodes the particular packet transmitted from the audio gateway, and the second flag is asserted by the processor when the processor successfully receives an acknowledgement from a secondary device wherein a reception of the acknowledgement indicates that the secondary device successfully receives and decodes the particular packet.

According to the embodiments, a method applied into a controller of a wireless stereo Bluetooth device is disclosed. The controller is capable of used as a primary device. The method comprises: providing a first flag and a second flag; asserting the first flag when the controller successfully receives and decodes the particular packet transmitted from the audio gateway; asserting the second flag when the controller successfully receives an acknowledgement from a secondary device wherein a reception of the acknowledgement indicates that the secondary device successfully receives and decodes the particular packet; and, transmitting an acknowledgement of a particular packet to an audio gateway when the first flag and the second flag are asserted.

According to the embodiments, a wireless stereo Bluetooth device with a multipoint connection function is disclosed. The device comprises a plurality of controllers. A controller comprises a memory and a processor. The memory is configured for storing a first flag and a second flag. The processor is coupled to the memory, and is capable of transmitting an acknowledgement of a particular packet to an audio gateway when the first flag and the second flag are asserted. The first flag is asserted by the processor when the processor successfully receives and decodes the particular packet transmitted from the audio gateway, and the second flag is asserted by the processor when the processor successfully receives an acknowledgement from a secondary device wherein a reception of the acknowledgement indicates that the secondary device successfully receives and decodes the particular packet.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a solution capable of reducing the number of audio packet retransmission in a wireless communication so as to improve system performance as far as possible. More particularly, the provided solution can be arranged to solve the problems of Bluetooth devices in a wireless Bluetooth audio communication system.

Figure 1:
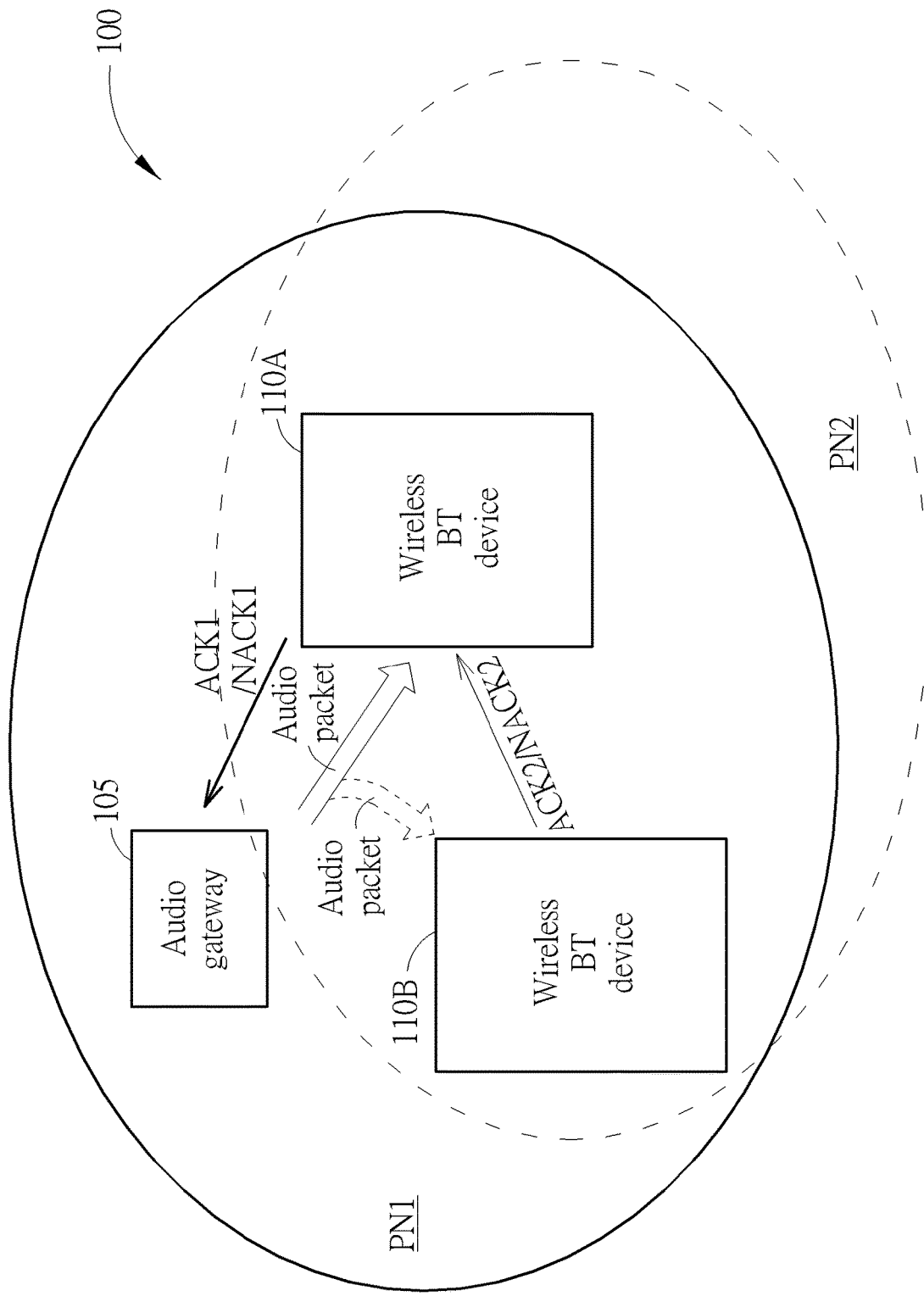
FIG. 1 is a block diagram of a wireless Bluetooth audio communication system according to embodiments of the invention.

Refer to FIG. 1. FIG. 1 is a block diagram of a wireless Bluetooth audio communication system 100 according to embodiments of the invention. The communication system 100 comprises an audio gateway 105 and for example two wireless Bluetooth devices 110A and 110B. The audio gateway 105 for example is a mobile phone device or smart phone device (but not limited). Bluetooth devices 110A and 110B are for example Bluetooth headsets, headphones, or wireless speakers (but not limited) which can receive wireless Bluetooth packet(s) of audio stream. For instance, the Bluetooth devices 110A and 110B may be two earphone devices for a user, and the audio gateway 105 may be the user's mobile phone device which transmits wireless packets to the devices 110A and 110B. For Bluetooth communication, one of the devices 110A and 110B is used as a primary device and the other is used as a secondary device. The devices 110A and 110B can negotiate with each other to determine which one is the primary device and which one is the secondary device.

A piconet for example is defined as an ad hoc network that links a wireless user group of devices using Bluetooth technology protocols. The audio gateway 105 and a primary device can communicate with each other directly in the first piconet PN1, and a secondary device does not communicate with audio gateway 105 directly in the first piconet PN1. For example, the primary device can send an acknowledgement signal back to the audio gateway 105 to notify the audio gateway 105 of successfully receiving and decoding an audio packet sent from audio gateway 105. A secondary device does not notify the audio gateway 105 by directly sending an acknowledgement signal to audio gateway 105.

In the embodiments, the audio gateway 105 is arranged to communicate with the primary device in the first piconet PN1 and to transmit packet (s) of audio stream to the primary device and the secondary device. For instance, the Bluetooth device 110A is used as a primary device, and the Bluetooth device 110B is used as a corresponding secondary device. Further, after the second piconet PN2 is established, no matter which one is used as the primary device, the Bluetooth devices 110A and 110B can be arranged to exchange and/or share control information and data. The Bluetooth device 110B as a secondary is arranged to sniff the audio packet (s) from audio gateway 105 and to send acknowledgement ACK2 or negative acknowledgement NACK2 to the Bluetooth device 110A based on the sniff result. The Bluetooth device 110A is arranged to send the acknowledgement ACK1 or negative acknowledgement NACK1 to the audio gateway 105 based on the reception result of audio packet and the sniff result of Bluetooth device 110B; the operations will be clearly described in later.

Figure 2:
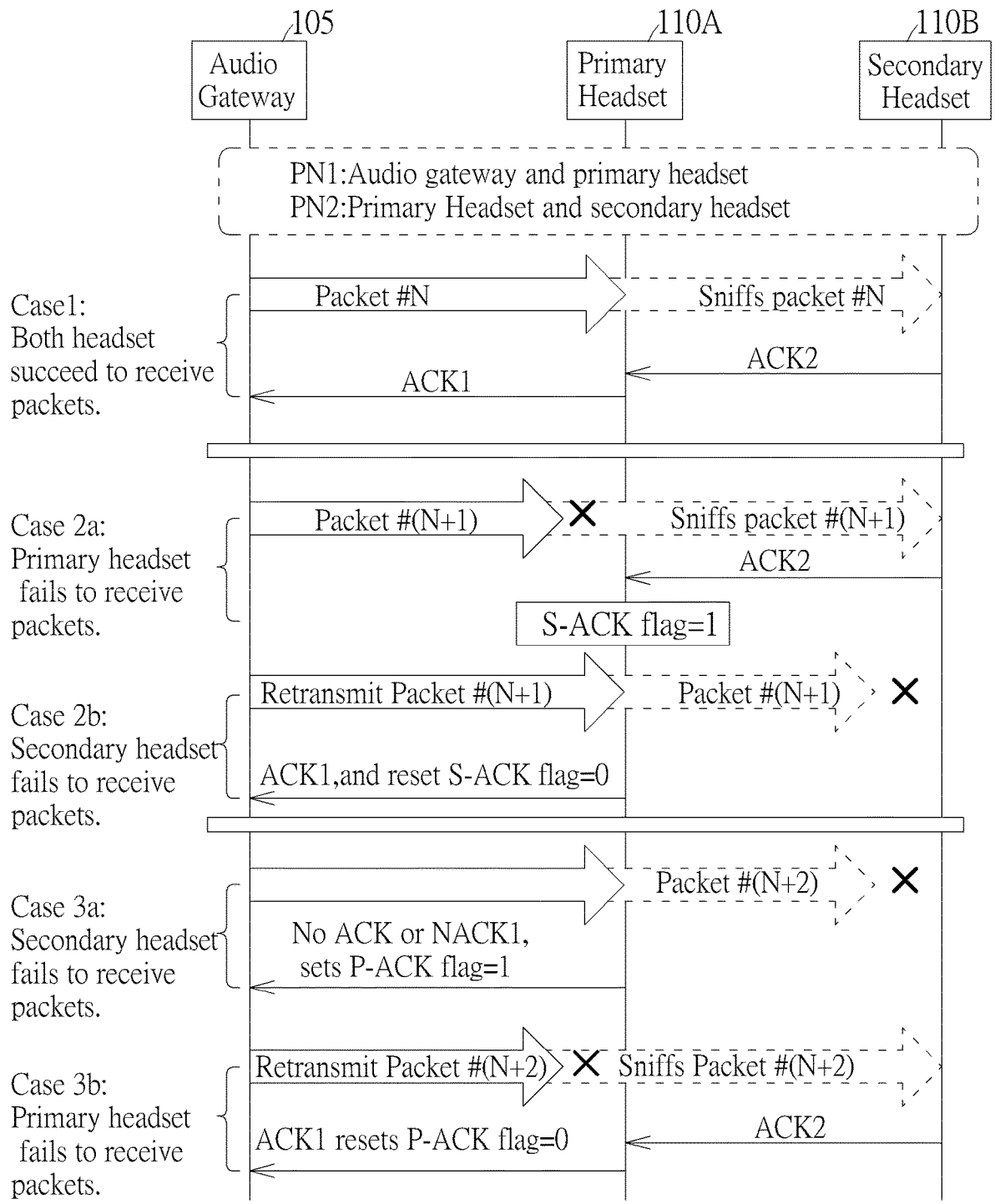
FIG. 2 is a timing diagram illustrating an example of the audio gateway, the Bluetooth device used as a primary headset, and the Bluetooth device used as a secondary headset according to the embodiments of FIG. 1.

Please refer to FIG. 2. FIG. 2 is a timing diagram illustrating an example of the audio gateway 105, the Bluetooth device 110A used as a primary headset, and the Bluetooth device 110B used as a secondary headset according to the embodiments of FIG. 1. In the first case of FIG. 2, the audio gateway 105 transmits the N-th packet indicated by #N to the primary headset 110A, and the secondary headset 110B sniffs the N-th packet #N. In this case, both the primary headset 110A and secondary headset 110B successfully receive and decode the N-th packet #N. The secondary headset 110B transmits an acknowledgement (ACK) to the primary headset 110A, and after receiving the acknowledgement ACK the primary headset 110A transmits another acknowledgement back to the audio gateway 105. When receiving the acknowledgement of the primary headset 110A, the audio gateway 105 can know that the N-th packet #N has been successfully received and decoded by both the headsets and may transmit a next packet.

In the second case 2a with 2b of FIG. 2, the audio gateway 105 transmits the (N+1)-th packet indicated by #(N+1) to the primary headset 110A, and the secondary headset 110B sniffs the (N+1)-th packet #(N+1). In this case, the secondary headset 110B successfully sniffs to received and then decodes the (N+1)-th packet #(N+1), and the primary headset 110A fails to receive and decode the (N+1)-th packet #(N+1). The secondary headset 110B is arranged to send an acknowledgement ACK to the primary headset 110A, and the primary headset 110A is arranged to assert the flag S-ACK after receiving the acknowledgement ACK of secondary headset 110B. For example, the flag S-ACK can be implemented by using a bit which is configured as '1' when the acknowledgement ACK of secondary headset 110B is received. Later, in a different timing, the audio gateway 105 retransmits the (N+1)-th packet to the primary headset 110A, and the secondary headset 110B sniffs the (N+1)-th packet #(N+1). In this case, the secondary headset 110B fails to sniff the retransmitted (N+1)-th packet #(N+1), and the primary headset 110A successfully receives and decodes the retransmitted (N+1)-th packet #(N+1). Even though the secondary headset 110B does not send an acknowledgement ACK to the primary headset 110A, the primary headset 110A can know that the content of (N+1)-th packet #(N+1) has been received and decoded by the secondary headset 110B based on the assertion of flag S-ACK. The primary headset 110A transmits an acknowledgement ACK to the audio gateway 105 and then resets or de-asserts the flag S-ACK as '0'. When receiving the acknowledgement of the primary headset 110A, the audio gateway 105 can know that the content of (N+1)-th packet #(N+1) whether originally transmitted or retransmitted has been successfully received and decoded by both the headsets and may transmit a next packet.

Further, in the third case 3a with 3b of FIG. 2, the audio gateway 105 transmits the (N+2)-th packet indicated by #(N+2) to the primary headset 110A, and the secondary headset 110B sniffs the (N+2)-th packet #(N+2). In this case, the secondary headset 110B fails to sniff the (N+2)-th packet #(N+2), and the primary headset 110A successfully receives and decodes the (N+2)-th packet #(N+2). The secondary headset 110B does not send an acknowledgement ACK to the primary headset 110A. The primary headset 110A is arranged to assert the flag P-ACK after successfully receiving and decoding the (N+2)-th packet #(N+2). Since the primary headset 110A does not receive the acknowledgement ACK of the secondary headset 110B, the primary headset 110A may be arranged to not transmit an acknowledgement ACK to the audio gateway 105 or may be arranged to transmit a negative acknowledgement NACK to the audio gateway 105. Later, in a different timing, the audio gateway 105 retransmits the (N+2)-th packet #(N+2) to the primary headset 110A, and the secondary headset 110B sniffs the retransmitted (N+2)-th packet #(N+2). In this case, the secondary headset 110B successfully sniffs the retransmitted (N+2)-th packet #(N+2), and the primary headset 110A fails to receive and decode the retransmitted (N+2)-th packet #(N+2). Even though the primary headset 110A fails to receive and decode the retransmitted (N+2)-th packet #(N+2), the primary headset 110A can know that the content of (N+2)-th packet #(N+2) has been received and decoded by the primary headset 110A in a previous timing based on the assertion of flag P-ACK. Then, when receiving the acknowledgement ACK of the secondary headset 110B, the primary headset 110A transmits another different acknowledgement ACK to the audio gateway 105 and then resets or de-asserts the flag P-ACK as '0'. When receiving the acknowledgement of the primary headset 110A, the audio gateway 105 can know that the content of (N+2)-th packet #(N+2) whether originally transmitted or retransmitted has been successfully received and decoded by both the headsets and may transmit a next packet.

Further, it is to be noted that the same audio packet may be retransmitted more times (e.g. twice or three times) if both the primary and secondary devices fail to receive such audio packet in one time slot. The number of retransmission of the same audio packet is not meant to be a limitation. The retransmission of the same audio packet may be arranged to not repeat until both the primary and secondary devices successfully receive and decode such audio packet or until the Bluetooth communication is disconnected.

By doing so, the number of retransmission of an audio packet can be reduced. The audio gateway 105 can efficiently transmit audio packet(s) to both the Bluetooth devices 110A and 110B.

Figure 3:
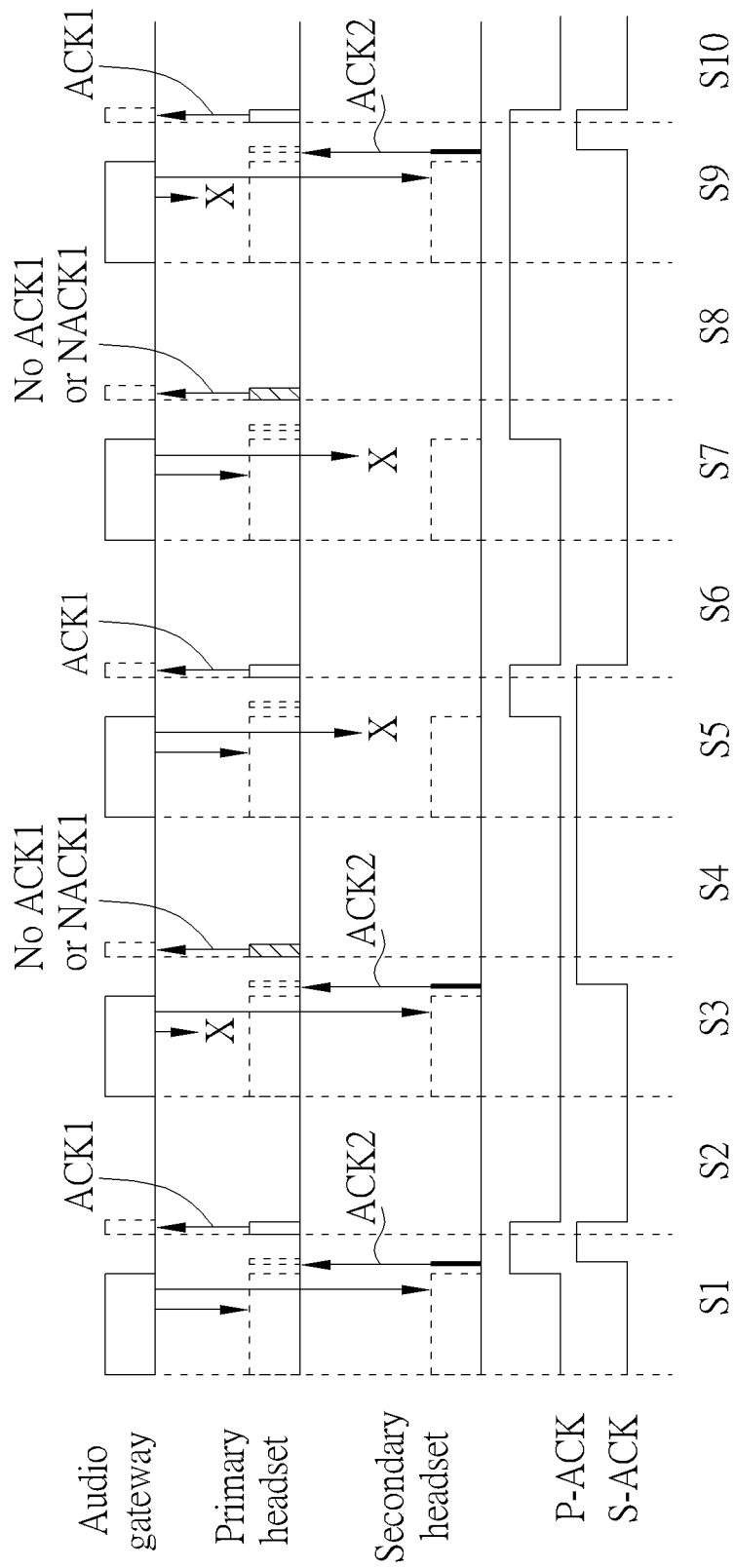
FIG. 3 is a diagram showing traffics of audio gateway, a primary device as a primary headset, and a secondary device as a secondary headset over aligned time slot boundary.

Refer to FIG. 3. FIG. 3 is a diagram showing traffics of audio gateway 105, primary device 110A as primary headset, and secondary device 110B as secondary headset over aligned time slot boundary. Piconets PN1 and PN2 have aligned Bluetooth time slot boundary. As shown in FIG. 3, for example, at time slot S1, the audio gateway 105 may wirelessly transmit an audio packet such as the N-th packet to the air, and both the primary device 110A and secondary device 110B successfully receive and decode such audio packet at time slot S1. The secondary device 110B at time slot S1 sends the acknowledge ACK2 to the primary device 110A. The primary device 110A asserts or sets the flag P-ACK as a high logical level (e.g. '1') when determining that the N-th audio packet has been successfully received and decoded by the primary device 110A, and then asserts or sets the flag S-ACK as '1' when determining that the acknowledgement ACK2 is successfully received by the primary device 110A.

At time slot S2, the primary device 110A sends the acknowledgement ACK1 to the audio gateway 105 and then de-asserts or resets both the flags P-ACK and S-ACK as a low logic level ('0'). Thus, based on the reception of the acknowledgement ACK1 transmitted from primary device 110A, the audio gateway 105 can determine that the N-th audio packet has been received by both the devices 110A and 110B and does not re-transmit the N-th audio packet.

At time slot S3, the audio gateway 105 may wirelessly transmit the (N+1)-th audio packet to the air, and the secondary device 110B successfully receives and decodes such audio packet at time slot S3 while the primary device 110A fails to receive and decode such audio packet at time slot S3. The secondary device 110B then at time slot S3 sends the acknowledge ACK2 to the primary device 110A. The primary device 110A then asserts or sets the flag S-ACK as '1' when determining that the acknowledgement ACK2 is successfully received by the primary device 110A; the flag P-ACK is still kept at '0'.

At time slot S4, the primary device 110A may send the negative acknowledgement NACK1 to the audio gateway 105 or may be arranged to not send the acknowledgement ACK1 to the audio gateway 105.

When receiving the negative acknowledgement NACK1 or detecting that no acknowledgements are received at time slot S4, the audio gateway 105 retransmits the (N+1)-th audio packet at time slot 5, and in this situation the primary device 110A successfully receives and decodes such retransmitted (N+1)-th audio packet at time slot S5 while the secondary device 110B fails to receive and decode such retransmitted (N+1)-th audio packet at time slot S5. The primary device 110A then asserts or sets the flag P-ACK as '1' when determining that the retransmitted (N+1)-th audio packet is successfully received by the primary device 110A; the flag S-ACK is kept at '1' at time slot S5.

When detecting that both the flags P-ACK and S-ACK are asserted or set as '1', the primary device 110A sends the acknowledgement ACK1 to the audio gateway 105 at a next time slot such time slot S6. Then, after sending ACK1, the primary device 110A de-asserts or resets both the flags P-ACK and S-ACK as '0' at time slot S6.

At time slot S7, the audio gateway 105 wirelessly transmits the (N+2)-th audio packet, and the primary device 110A successfully receives and decodes such audio packet at time slot S7 while the secondary device 110B fails to receive and decode such audio packet at time slot S7. The secondary device 110B does not send the acknowledgement ACK2 to the primary device 110A. Since no acknowledgements of secondary device 110B are received at time slot S7, the primary device 110A keeps the flag S-ACK at '0'. For flag P-ACK, the primary device 110A asserts or sets the flag P-ACK as '1' when determining that the (N+2)-th audio packet is successfully received and decoded by the primary device 110A.

At time slot S8, when detecting that at least one of the flags P-ACK and S-ACK is not asserted, the primary device 110A may send the negative acknowledgement NACK1 to the audio gateway 105 to indicate that it is needed to retransmit the audio packet or may be arranged to not send the acknowledgement ACK1 to the audio gateway 105. At time slot S8, the flag P-ACK and flag S-ACK are kept at '1' and '0', respectively.

At time slot S9, when receiving the negative acknowledgement NACK1 or detecting that no acknowledgements are received at time slot S8, the audio gateway 105 retransmits the (N+2)-th audio packet, and in this situation the secondary device 110B successfully receives and decodes such retransmitted (N+2)-th audio packet at time slot S9 while the primary device 110A may fail to receive and decode such retransmitted (N+2)-th audio packet at time slot S9. The secondary device 110B sends the acknowledgement ACK2 to the primary device 110A after receiving and decoding the retransmitted (N+2)-th audio packet. The primary device 110A then asserts or sets the flag S-ACK as '1' when determining that the acknowledgement ACK2 is received by the primary device 110A. The flag P-ACK is kept at '1' at time slot S9.

At time slot S10, when detecting that both the flags P-ACK and S-ACK are asserted or set as '1', the primary device 110A sends the acknowledgement ACK1 to the audio gateway 105 at a next time slot such time slot S10. Then, after sending ACK1, the primary device 110A de-asserts or resets both the flags P-ACK and S-ACK as '0'.

Thus, by doing so, the Bluetooth device (e.g. 110A) determined as a primary can be arranged to employ the flag S-ACK to record whether an audio packet (whether it is transmitted for the first time or is retransmitted) is successfully received and decoded by a secondary device and to employ the flag P-ACK to record whether the audio packet (whether it is transmitted for the first time is retransmitted) is successfully received and decoded by the primary device.

Figure 4:
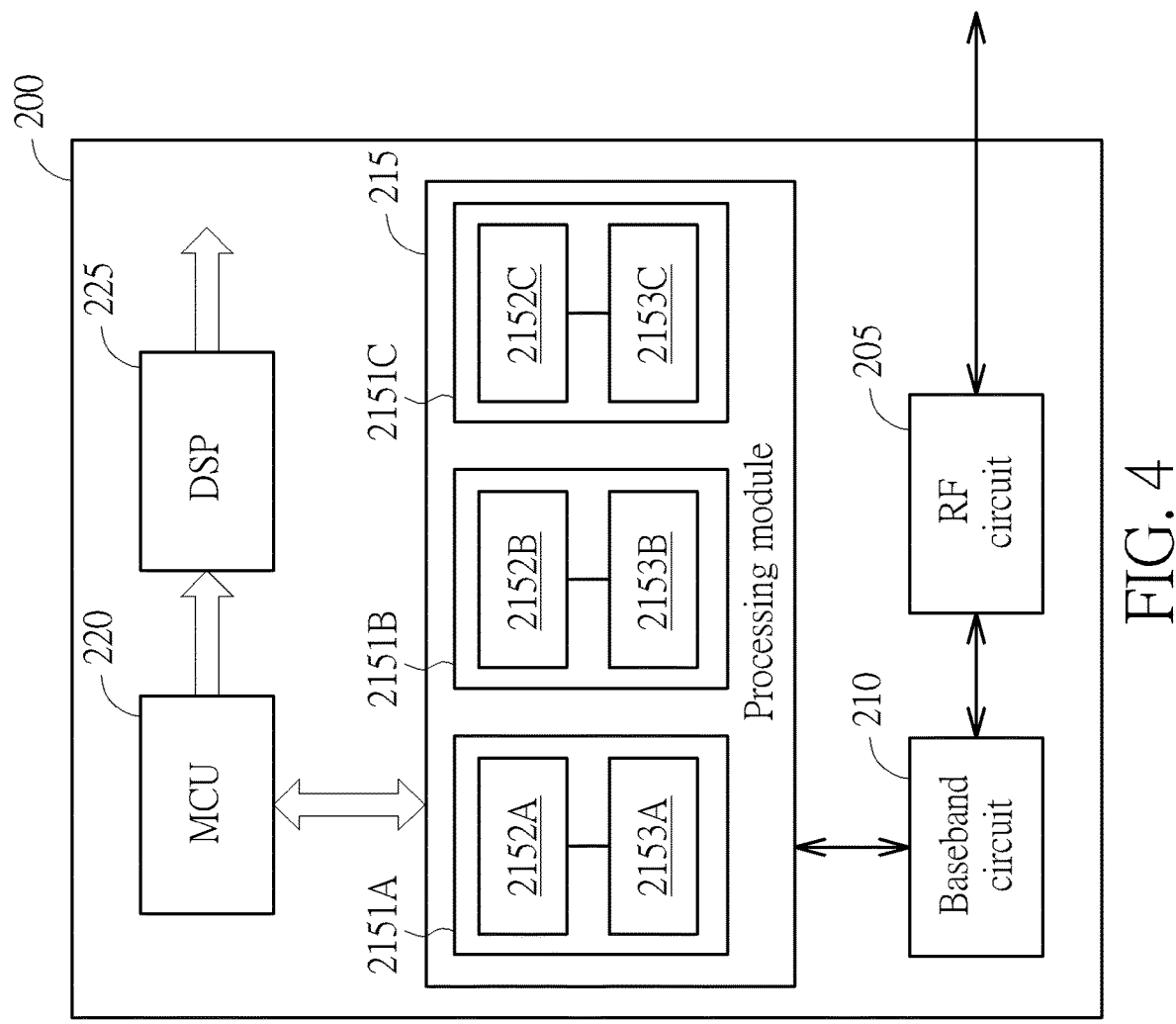
FIG. 4 is a block diagram of an implementation embodiment of a wireless Bluetooth device shown in FIG. 1.

FIG. 4 is a block diagram of an implementation embodiment of a wireless Bluetooth device 200 shown in FIG. 1. Each of the Bluetooth devices 110A and 110B can be implemented by using the wireless Bluetooth device 200. That is, the above-mentioned operations and functions of Bluetooth devices 110A and 110B are implemented by using the circuit elements comprised within the device 200. The wireless Bluetooth device 200 for example is with a multipoint connection function and comprises a plurality of controllers such as three controllers (but not limited) wherein one controller is used for supporting management/control traffic exchange and two controls are used for supporting different audio channels. The multipoint connection function means that the Bluetooth device 200 is capable of supporting multiple Bluetooth audio communication channels. For example, in a Bluetooth audio communication channel, the Bluetooth device 200 may be a primary device, and in another Bluetooth audio communication channel the Bluetooth device 200 may be a secondary device. However, this is not intended to be a limitation. The Bluetooth device 200 may be a primary for multiple Bluetooth audio communication channels or may be a secondary for multiple Bluetooth audio communication channels.

In practice, as shown in FIG. 4, the Bluetooth device 200 comprises an RF circuit 205, a baseband circuit 210, a processing module 215, a microcontroller unit (MCU) 220, and a digital signal processor (DSP) 225. The processing module 215 for example is a Bluetooth modem controlling module which comprises three piconet controllers 2151A-2151C which respectively comprise memories 2152A-2152C and processors 2153A-2153C. The RF circuit 205 is an RF transceiver used for receiving a radio signal corresponding to audio packets from an antenna (not illustrated) of Bluetooth device 200 to generate a digital signal. The baseband circuit 210 is coupled to the RF circuit 205 and used for receiving and processing the digital signal in digital domain and then providing the processed digital signal for the processing module 215 wherein the processed digital signal comprises audio data samples and control data.

The controller 2151A comprises the memory 2152A and processor 2153A wherein the processor 2153A is arranged for perform peer-to-peer control between two Bluetooth devices to exchange/share information such as Bluetooth clock, channel information of a piconet, Bluetooth address, and so on. In addition, for determining whether the Bluetooth device 200 is a primary device or a secondary device, in one embodiment, the controller 2151A is arranged to alternatively page to find another controller of another Bluetooth device or listen whether it is paged by such another controller. If the controller 2151A is found by such another controller, then the Bluetooth device 200 is determined as the secondary device, otherwise, the Bluetooth device 200 is determined as the primary device.

The other two controllers 2151B and 2151C respectively support different audio channels. For example, the controller 2151B can be used as a primary device for receiving Bluetooth packets from an audio gateway in the Bluetooth mode and for receiving an acknowledgement of a secondary device in the TWS (wireless stereo) mode in a piconet, for the same audio channel such as channel A. The controller 2151C can be used as a primary device for receiving Bluetooth packets from another different audio gateway in the Bluetooth mode and for receiving an acknowledgement of another secondary device in the TWS mode in another different piconet, for the same audio channel such as channel B. The memory 2152B is configured to include and record a set of flags P-ACK and S-ACK, and the memory 2152C is configured to include and record a different set of flags P-ACK and S-ACK. The processors 2153B and 2153C are arranged to respectively perform corresponding operations (assertion/de-assertion of flags and transmission of acknowledgement) associated with the first set of flags P-ACK and S-ACK and the second set of flags P-ACK and S-ACK; the descriptions are not detailed for brevity.

MCU 220 is arranged to retrieve audio data and provide the audio data to the DSP 225. The DSP 225 is arranged to generate audio codecs based on the audio data and output the audio codecs for audio playing. In the same piconet, the DSP (e.g. 225) of primary headset 110A and the DSP of secondary headset 110B are arranged to keep the same Bluetooth clock. In practice, the DSP clock of secondary headset 110B is aligned with that of primary headset 110A. In addition, both the primary headset 110A and secondary headset 110B respectively include buffers for temporarily storing multiple audio packets. In the example of FIG. 4, the DSP 225 may include two buffers respectively supporting the piconet controllers 2151B and 2151C for different piconets. In addition, for example, a buffer may be configured to buffer the amount audio packets corresponding to audio samples with 200 ms, and one audio packet may correspond to audio samples with 5 ms (but not limited). When playing audio samples of a sequence of audio packets, the DSP 225 of primary headset 110A and another DSP of secondary headset 110B are capable of outputting audio codecs corresponding to audio samples of the same packet at the same time based on the aligned clocks for sync audio playing.

Figure 5:
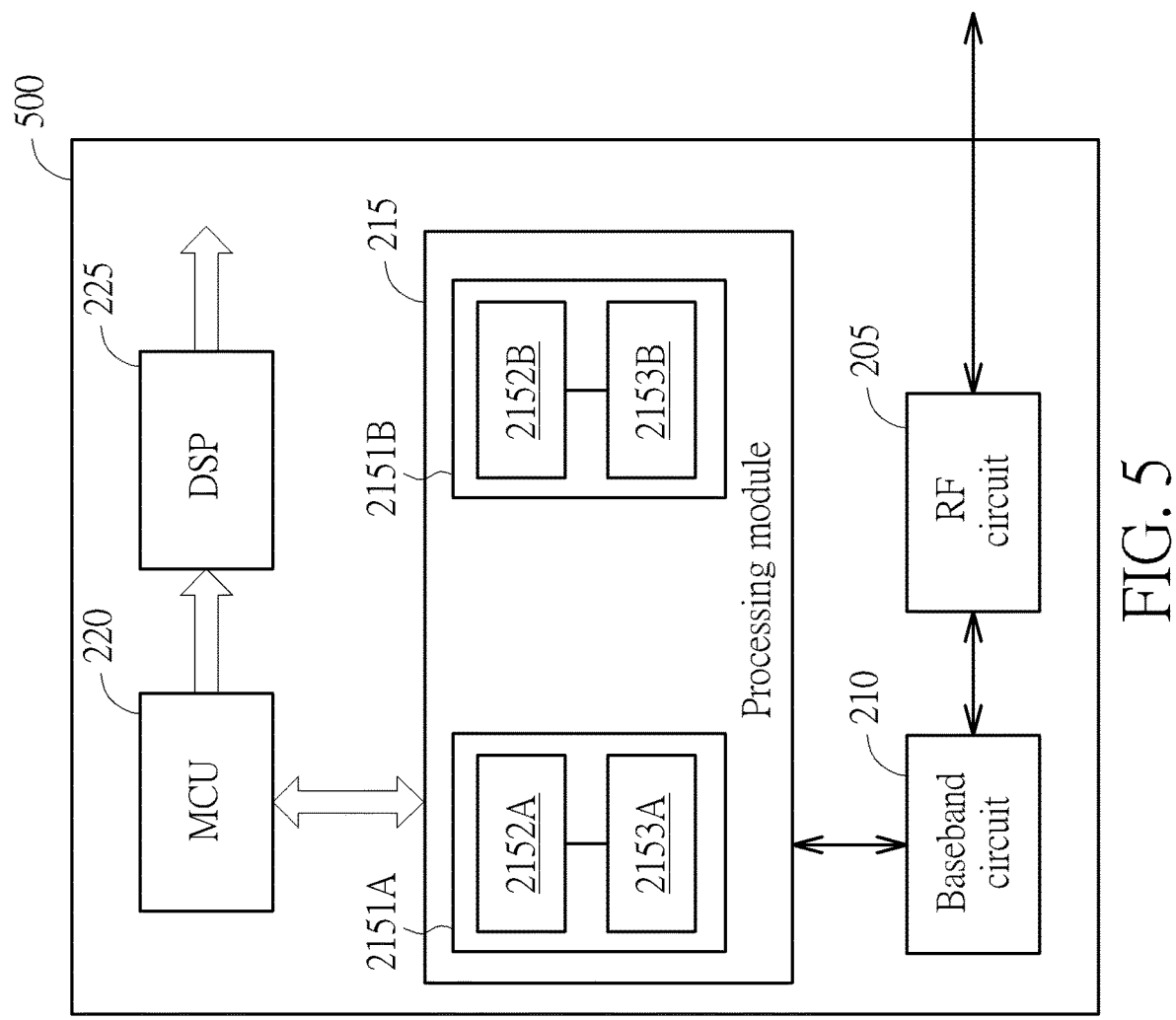
FIG. 5 is a block diagram of another implementation embodiment of a wireless Bluetooth device shown in FIG. 1.

Additionally, it should be noted that in other embodiments a wireless stereo Bluetooth device may be with a single point connection function and comprise a controller used as a primary device or a secondary device. FIG. 5 shows a block diagram of another implementation 500 of the wireless Bluetooth device 200 shown in FIG. 4. The operations and functions of circuit units in FIG. 5 are not detailed for brevity.

Further, in other implementations, a controller of a wireless Bluetooth device may comprise a single flag which is stored by the above-mentioned memory and asserted by the above-mentioned processor when the processor successfully receives an acknowledgement from a secondary device wherein a reception of the acknowledgement indicates that the secondary device successfully receives a particular audio packet. The processor is arranged for transmitting an acknowledgement of such particular audio packet to the audio gateway when such particular audio packet is received and the flag is asserted. That is, to achieve the functions described in the previous paragraphs, the number of flags is not meant to be a limitation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A controller of a wireless Bluetooth device, comprising:
   a memory, configured for storing a first flag and a second flag; and
   a processor, coupled to the memory, configured for transmitting an acknowledgement of a particular packet to an audio gateway when the first flag and the second flag are asserted;
   wherein the first flag is not asserted and the second flag becomes asserted when the particular packet is not received by the processor and the processor successfully receives an acknowledgement from a secondary device wherein a reception of the acknowledgement indicates that the secondary device successfully receives the particular packet during a first time slot; and, the first flag becomes asserted and the second flag is kept asserted when the particular packet is successfully received by the processor from the audio gateway during a second time slot later than the first time slot.

2. The controller of claim 1, wherein the first flag and the second flag are de-asserted by the processor after the processor transmits the acknowledgement of the particular packet to the audio gateway.

3. The controller of claim 1, wherein the first flag is asserted by the processor when the processor successfully receives and decodes the particular packet transmitted from the audio gateway, and the reception of the acknowledgement indicates that the secondary device successfully receives and decodes the particular packet.

4. A method applied into a controller of a wireless Bluetooth device, comprising:
   providing a first flag and a second flag;

asserting the first flag when the controller successfully receives the particular packet transmitted from the audio gateway;

asserting the second flag when the controller successfully receives an acknowledgement from a secondary device wherein a reception of the acknowledgement indicates that the secondary device successfully receives the particular packet; and transmitting an acknowledgement of a particular packet to an audio gateway when the first flag and the second flag are asserted;

wherein the first flag is asserted by a processor of the controller at a first time slot, and the second flag is asserted by a processor of the controller at a second time slot which is different from the first time slot; and the first flag is not asserted and the second flag becomes asserted when the particular packet is not received by the processor and the processor successfully receives an acknowledgement from a secondary device wherein a reception of the acknowledgement indicates that the secondary device successfully receives the particular packet during a first time slot, and, the first flag becomes asserted and the second flag is kept asserted when the particular packet is successfully received by the processor from the audio gateway during a second time slot later than the first time slot.

5. The method of claim 4, further comprising:

de-asserting the first flag and the second flag after the acknowledgement of the particular packet is transmitted to the audio gateway.

6. The method of claim 4, wherein the first flag is asserted when the processor successfully receives and decodes the particular packet transmitted from the audio gateway, and the reception of the acknowledgement indicates that the secondary device successfully receives and decodes the particular packet.

7. A wireless Bluetooth device with a multipoint connection function, comprising:

a plurality of controllers, a controller comprising:

a memory, configured for storing a first flag and a second flag; and a processor, coupled to the memory, capable of transmitting an acknowledgement of a particular packet to an audio gateway when the first flag and the second flag are asserted;

wherein the first flag is not asserted and the second flag becomes asserted when the particular packet is not received by the processor and the processor successfully receives an acknowledgement from a secondary device wherein a reception of the acknowledgement indicates that the secondary device successfully receives the particular packet during a first time slot; and, the first flag becomes asserted and the second flag is kept asserted when the particular packet is successfully received by the processor from the audio gateway during a second time slot later than the first time slot.

8. The device of claim 7, wherein the first flag and the second flag are de-asserted by the processor after the processor transmits the acknowledgement of the particular packet to the audio gateway.

9. The device of claim 7, wherein one among the plurality of controllers is used as a primary device corresponding to a first piconet of a first audio gateway, and another among the plurality of controllers is used as a secondary device corresponding to a second piconet of a second audio gateway which is different from the first audio gateway.

10. The device of claim 7, wherein the first flag is asserted when the processor successfully receives and decodes the particular packet transmitted from the audio gateway, and the reception of the acknowledgement indicates that the secondary device successfully receives and decodes the particular packet.

11. A controller of a wireless Bluetooth device, comprising: a memory, configured for storing a flag; and a processor, coupled to the memory, configured for transmitting an acknowledgement of a particular packet to an audio gateway when the particular packet is received and the flag is asserted; wherein the flag becomes asserted when the particular packet is not received by the processor and the processor successfully receives an acknowledgement from a secondary device wherein a reception of the acknowledgement indicates that the secondary device successfully receives the particular packet during a first time slot, and, the flag is kept asserted when the particular packet is successfully received by the processor from the audio gateway during a second time slot later than the first time slot.

* * * * *